(12) United States Patent
Shi et al.

(10) Patent No.: US 11,549,657 B2
(45) Date of Patent: Jan. 10, 2023

(54) DEVICE FOR INSTALLING REFLECTION BOWL OF LED HEADLAMP

(71) Applicant: Hefei Wisdom Bridge Information Technology Co., Ltd., Hefei (CN)

(72) Inventors: Kan Shi, Hefei (CN); Yongsheng Xiao, Hefei (CN); Zheng Zhang, Hefei (CN); Zhen Xiao, Hefei (CN)

(73) Assignee: Hefei Wisdom Bridge Information Technology Co., Ltd., Hefei (CN)

( * ) Notice: Subject to any disclaimer, the term of this patent is extended or adjusted under 35 U.S.C. 154(b) by 0 days.

(21) Appl. No.: 17/565,222

(22) Filed: Dec. 29, 2021

(65) Prior Publication Data

US 2022/0186920 A1 Jun. 16, 2022

Related U.S. Application Data

(63) Continuation of application No. PCT/CN2021/125026, filed on Oct. 20, 2021.

(51) Int. Cl.
*B23P 21/00* (2006.01)
*F21S 45/49* (2018.01)

(52) U.S. Cl.
CPC .............. *F21S 45/49* (2018.01); *B23P 21/00* (2013.01); *Y10T 29/53213* (2015.01)

(58) Field of Classification Search
CPC ...... F21S 45/49; B23P 21/00; Y10T 29/53213
USPC .......... 29/748, 747, 745, 729, 700, 739, 740
See application file for complete search history.

(56) References Cited

U.S. PATENT DOCUMENTS

2017/0349087 A1    12/2017   Wu

FOREIGN PATENT DOCUMENTS

| CN | 103624543 A |   | 3/2014  |            |
|----|-------------|---|---------|------------|
| CN | 104889729 A | * | 9/2015  |            |
| CN | 105149940 B | * | 7/2017  |            |
| CN | 108655725 A | * | 10/2018 | ... B23P 21/00 |
| CN | 109217075 A |   | 1/2019  |            |
| CN | 210214394 U |   | 3/2020  |            |
| CN | 111215885 A |   | 6/2020  |            |
| CN | 111348436 A |   | 6/2020  |            |
| CN | 211277342 U |   | 8/2020  |            |
| CN | 112283604 A |   | 1/2021  |            |
| CN | 112355628 A |   | 2/2021  |            |
| CN | 112361237 A |   | 2/2021  |            |
| CN | 112404922 A |   | 2/2021  |            |
| CN | 112404923 A |   | 2/2021  |            |

\* cited by examiner

*Primary Examiner* — Peter Dungba Vo
*Assistant Examiner* — Azm A Parvez
(74) *Attorney, Agent, or Firm* — Wayne IP LLC

(57) ABSTRACT

A device for assembling a reflection bowl of an intelligent LED headlamp, including a first feeding device, a second feeding device and a third feeding device. The first feeding device is configured to lead a heat sink base out. The second feeding device is configured to lead the reflection bowl out to an outlet of the first feeding device and assemble the reflection bowl with the heat sink base. The third feeding device is configured to feed a LED lamp bead to the outlet of the first feeding device and assemble the LED lamp bead with the heat sink base.

8 Claims, 16 Drawing Sheets

DEVICE FOR INSTALLING REFLECTION BOWL OF LED HEADLAMP

CROSS-REFERENCE TO RELATED APPLICATIONS

This application is a continuation of International Patent Application No. PCT/CN2021/125026, filed on Oct. 20, 2021, which claims the benefit of priority from Chinese Patent Application No. 202011131625.3, filed on Oct. 21, 2020. The content of the aforementioned applications, including any intervening amendments thereto, is incorporated herein by reference in its entirety.

TECHNICAL FIELD

This application relates to light-emitting diode (LED) lamp assembly, and more specifically to a device for installing a reflection bowl of an intelligent LED headlamp.

BACKGROUND

In the actual application, a lens is generally arranged outside a LED bead of a vehicle lamp cap to enhance the brightness of the LED lamp cap and achieve the light-condensing effect, so as to allow for a higher penetrability. In the actual assembling process, a LED lamp bead is fixedly arranged on a heat sink base through a reflection bowl. The heat sink base is provided with a groove for accommodating the LED lamp bead. The reflection bowl is fixedly arranged on the heat sink base through screws. A lead wire of the LED lamp bead passes through a through hole on the heat sink base. After the installation of the LED lamp cap and the heat sink base, the heat sink base is introduced into a LED lamp tube of the LED lamp cap to realize the connection between the heat sink base and the LED lamp tube. An end of the LED lamp tube is provided with a lens to form the LED lamp cap. The LED lamp cap can be installed in the vehicle headlight for actual use. Nevertheless, the assembly of the LED lamp cap is usually performed manually, resulting in a poor assembling efficiency. Moreover, after the lead wire of the LED lamp bead passes through the through hole on the heat sink base B, the LED lamp bead C tends to be separated from the lead wire when the lead wire is drawn by an external force, resulting in the scrap of the LED lamp cap.

SUMMARY

An object of the present disclosure is to provide a device for assembling a reflection bowl of an intelligent light-emitting diode (LED) headlamp to improve the production efficiency and quality of the LED lamp cap and enhance the protection for the LED lamp wick.

The technical solutions of the present disclosure are described as follows.

A device for assembling a reflection bowl of an intelligent LED headlamp, comprising:
  a first feeding device;
  a second feeding device; and
  a third feeding device;
  wherein the first feeding device is configured to lead a heat sink base out; the second feeding device is configured to lead the reflection bowl out to an outlet of the first feeding device and assemble the reflection bowl with the heat sink base; and the third feeding device is configured to feed a LED lamp bead to the outlet of the first feeding device and assemble the LED lamp bead with the heat sink base.

In an embodiment, lead wire threading device is arranged on a side of a positioning-mounting mechanism, and the lead wire threading device is configured to guide a lead wire of the LED lamp bead to pass through a mounting hole of the heat sink base.

In an embodiment, a fourth feeding device is also arranged on a side of the outlet of the first feeding device, and the fourth feeding device is configured to mount a bottom cover on the heat sink base.

In an embodiment, the first feeding device comprises a first vibration plate; an outlet of the first vibration plate is provided with a first lead-out rail; an outlet of the first lead-out rail is provided with an extraction rack; the extraction rack is arranged on a turnover mechanism; the turnover mechanism is configured to drive the extraction rack to perform a 180° turning action and an axis of rotation is arranged horizontally; the fourth feeding device is arranged on one side of the extraction rack; and a fifth feeding device is arranged on the other side of the extraction rack.

In an embodiment, the extraction rack is provided with two extraction rods arranged horizontally and spaced apart; the two extraction rods are configured to move horizontally to respectively form a plug-in clamping fit with two notches on the heat sink base; a baffle plate is arranged at the outlet of the first lead-out rail; a surface of the lead-out rail is provided with two openings to respectively avoid the two extraction rods; the two extraction rods are slidably arranged on the extraction rack; each of the two extraction rods is sleeved with a return spring; one end of the return spring abuts against one end of the two extraction rods and the other end of the return spring abuts against the extraction rack; the extraction rack is provided with an first cylinder; the first cylinder is arranged in parallel with the two extraction rods; and a piston rod of the first cylinder is connected to the two extraction rods.

In an embodiment, the turnover mechanism comprises a turnover base; the turnover base is rotatably connected to the extraction rack; the extraction rack is provided with a deflection rod; the deflection rod is hinged with a piston rod of a second cylinder; the piston rod of the second cylinder and the deflection rod are arranged vertically; and the second cylinder is hingedly arranged on the turnover base.

In an embodiment, a support base is arranged on a side of the turnover mechanism; the support base is provided with a groove configured to clamp the heat sink base; the support base is provided with a support slide rod; the support slide rod is vertically and slidably arranged on a rack; the support slide rod is sleeved with a support spring; and one end of the support spring abuts against the rack, and the other end of the support spring abuts against the support base.

In an embodiment, the third feeding device comprises a feeding rack; the feeding rack is provided with a clamping block configured to clamp the LED lamp bead; the clamping block is configured to move vertically to allow the LED lamp bead to be guide into a groove of the heat sink base; and a lead wire rack configured for supporting a wire bundle is arranged on a side of the clamping block.

In an embodiment, a gluing mechanism is arranged below the clamping block; the gluing mechanism is configured to wire bundle a glue on the groove of the heat sink base; the gluing mechanism comprises a gluing nozzle; the gluing nozzle is arranged on a lifting mechanism; the lifting mechanism is configured to move the gluing nozzle vertically to abut against or be separated from a bottom of the groove of the heat sink base.

In an embodiment, the clamping block is vertically arranged on a rail; and a return spring is arranged on the rail;

an upper end of the return spring abuts against an upper end of the rail, and a lower end of the return spring abuts against an upper surface of the clamping block; a drive head is arranged above the clamping block; an upper end of the drive head is connected to a piston rod of a driving cylinder, and the driving cylinder is arranged vertically.

In an embodiment, the clamping block is vertically and slidably arranged on a lifting block; a compression spring is arranged between the clamping block and the lifting block; the lifting block is vertically and slidably arranged on the rail; and one end of the return spring abuts against an upper end of the lifting block, and the other end of the return spring abuts against an upper end of the rail.

In an embodiment, a side of the clamping block is provided with two sets of clamping belts configured to clamp the LED lamp bead; an outlet of each of the two sets of clamping belts is provided with a support plate configured to support the LED lamp bead; a side of each of the two support plates is hinged on a frame, wherein a hinge axis is arranged horizontally; the clamping block is arranged above the frame; a bottom of a slot of the clamping block is provided with an air suction port; the air suction port is communicated with an inlet of a suction unit; and the suction unit is configured to adsorb the LED lamp bead.

In an embodiment, the lead wire rack is provided with a grate rack; the grate rack is vertically and slidably arranged on a lifting rack through a vertical sliding rod; the lifting rack is horizontally and slidably arranged on the lead wire rack; the vertical sliding rod is sleeved with a vertical spring, one end of the vertical spring is connected to the lead wire rack, and the other end of the vertical spring is connected to the lifting rack; an end of the vertical sliding rod extending out of the lifting rack is provided with a lifting roller; the lifting roller abuts against a lifting folded plate; the lead wire rack is provided with a horizontal cylinder; a piston of the horizontal cylinder is connected to the lifting rack; and the lifting folded plate is arranged in parallel with the horizontal cylinder.

In an embodiment, the second feeding device comprises a second lead-out rail; the second lead-out rail is arranged above an outlet of the third feeding device; an outlet of the second lead-out rail is provided with a compression joint; the compression joint is provided with a groove configured to accommodate the reflection bowl; an adsorption mechanism is arranged in the compression joint; and the adsorption mechanism is configured to adsorb the reflection bowl.

In an embodiment, the reflection bowl is provided with a clamping hole; a clamping boss is arranged on a side of a slot of the heat sink base for clamping a LED lamp wick; and the clamping boss is in plug-in fit with the clamping hole arranged on the reflection bowl.

In an embodiment, a baffle plate is arranged at the outlet of the second lead-out rail; a bottom of the lead-out rail is hingedly provided with two crimping plates; a hinge shaft of each of the two crimping plates is horizontal and arranged in parallel with the lead-out rail; the hinged shaft is sleeved with a torsion spring, and the torsion spring is configured to allow surfaces of the two crimping plates to be horizontal.

Compared to the prior art, the present disclosure has the following beneficial effects.

During the assembly of a LED lamp cap by using the system provided herein, the first feeding device feeds the heat sink base to an outlet of the first feeding device in a specific posture; the second feeding device feeds the reflection bowl to a position above the heat sink base in a specific posture; and the third feeding device feeds the LED lamp bead to the mounting groove of the heat sink base. Then the reflection bowl is mounted on the heat sink base. The automatic production system provided herein can improve the production efficiency and quality of the LED lamp cap and enhance the protection for the LED lamp wick.

DETAILED DESCRIPTION OF EMBODIMENTS

To make the object and beneficial effects clearer, the disclosure will be described in detail below with reference to the accompanying drawings and embodiments. It should be noted that the following description is only illustrative of the present disclosure, and are not intended to limit the scope of the present disclosure. As used herein, the terms "parallel" and "perpendicular" are not strictly limited to their geometric definitions, but include tolerances for reasonable and inconsistent machining or human errors.

A device for assembling a reflection bowl of an intelligent light-emitting diode (LED) headlamp will be described below with reference to a whole system for automatically producing a LED lamp cap.

The features of the automatic production system of the LED lamp cap are specifically described below.

Provided herein is a system for automatically producing a LED lamp cap, which includes a first feeding device 10, a second feeding device 20, and a third feeding device 30. The first feeding device 10 is configured to lead a heat sink base B out. The second feeding device 20 is configured to lead a reflection bowl A out to an outlet of the first feeding device 10 to achieve the assembly of the reflection bowl and the heat sink base. The third feeding device 30 is configured to feed a LED lamp bead C to the outlet of the first feeding device 10 to achieve the assembly of the LED lamp bead and the heat sink base. A fourth feeding device 40 is arranged on a side of the first feeding device 10 for feeding a lamp tube D. A positioning-mounting mechanism is arranged on a side of the fourth feeding device 40. The positioning-mounting mechanism is configured to achieve the assembly of the lamp tube and the heat sink base.

Figure 1:
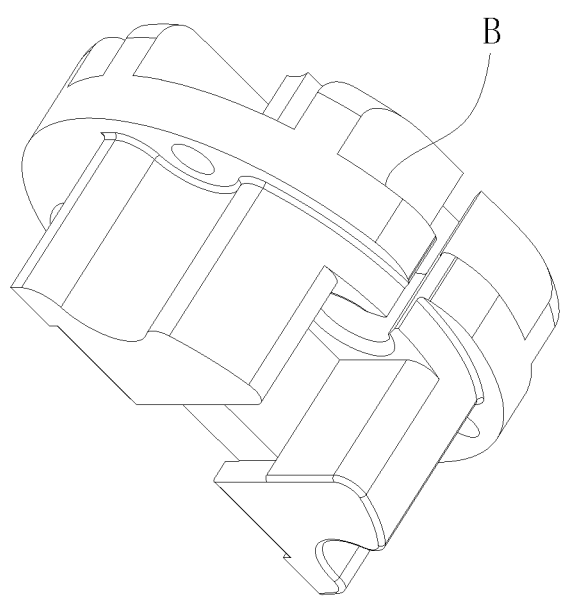
FIG. 1 schematically shows a structure of a heat sink base according to an embodiment of the present disclosure.
Figure 2:
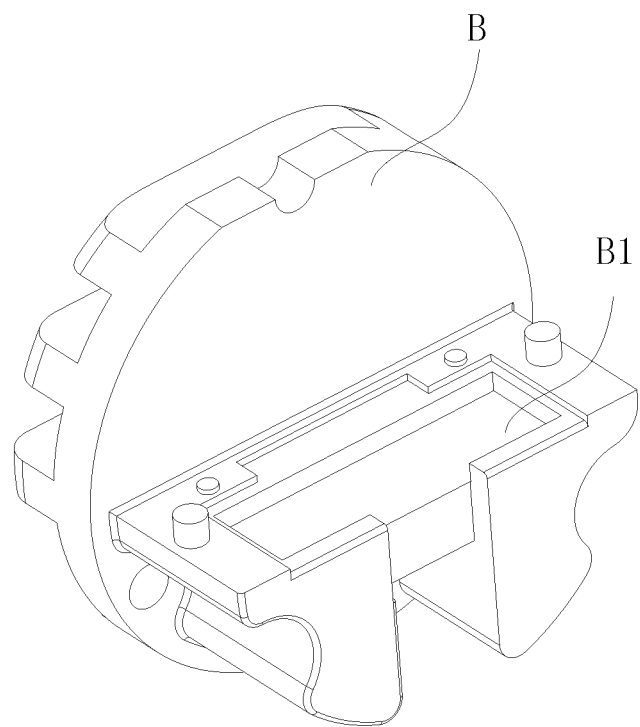
FIG. 2 schematically shows the structure of the heat sink base according to an embodiment of the present disclosure from another perspective.
Figure 3:
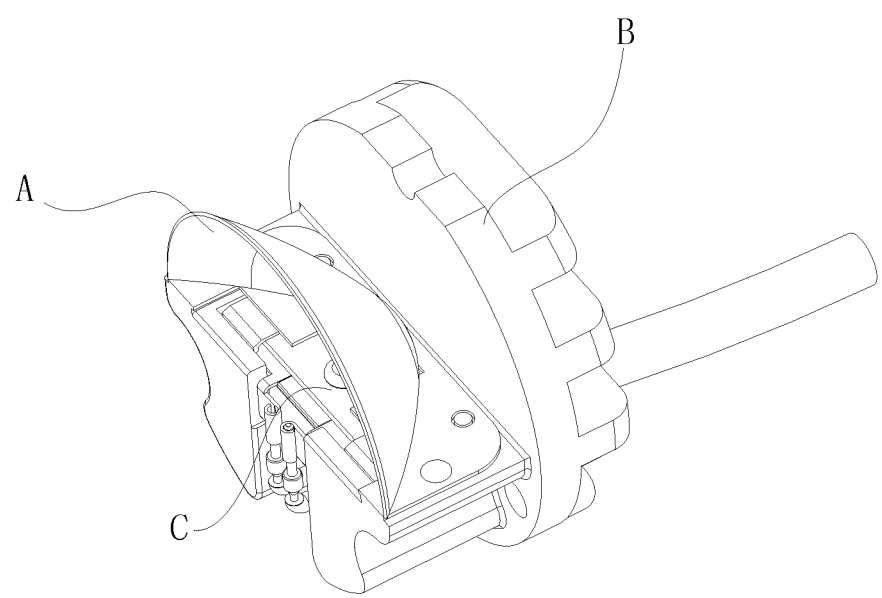
FIG. 3 is a structural diagram of the heat sink base, a LED lamp wick, and a reflection bowl according to an embodiment of the present disclosure.
Figure 4:
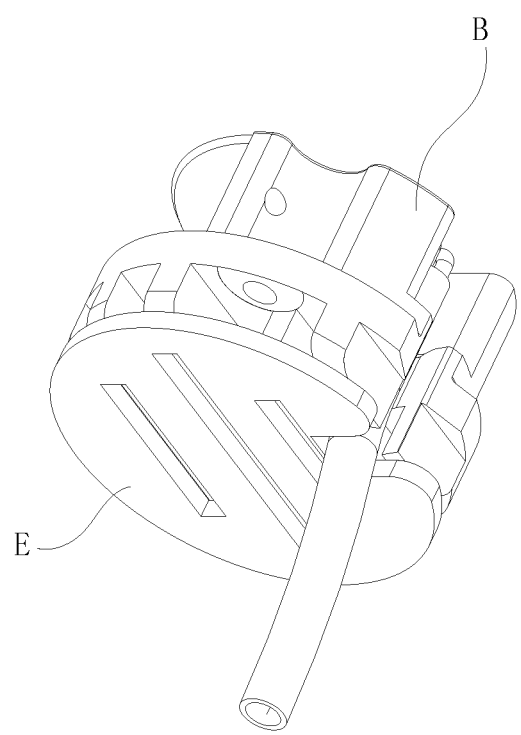
FIG. 4 is a structural diagram of the heat sink base after a bottom cover is mounted.
Figure 5:
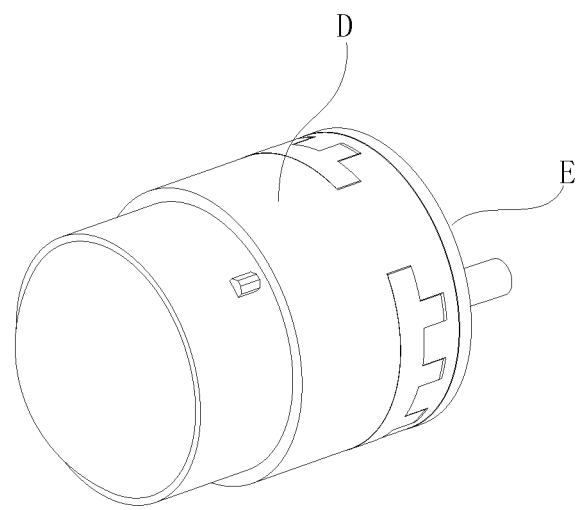
FIG. 5 is a structural diagram of a LED lamp cap according to an embodiment of the present disclosure.
Figure 6:
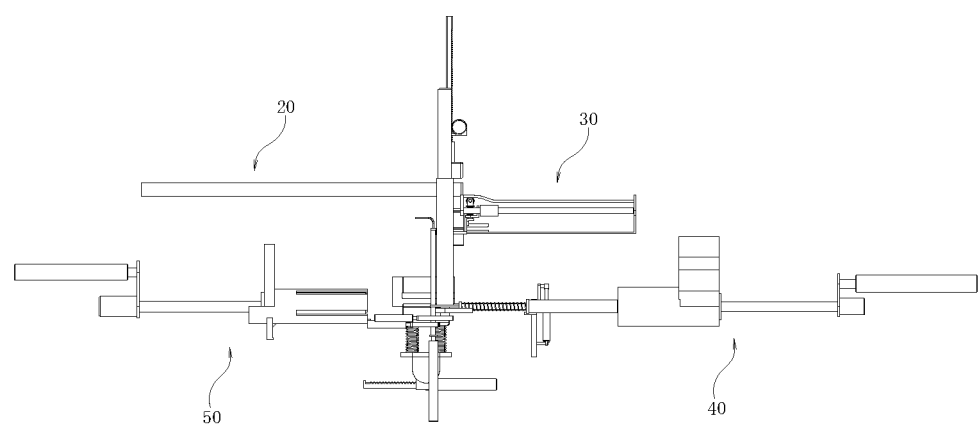
FIG. 6 is a front view of an automatic production system for the LED lamp cap according to an embodiment of the present disclosure.
Figure 7:
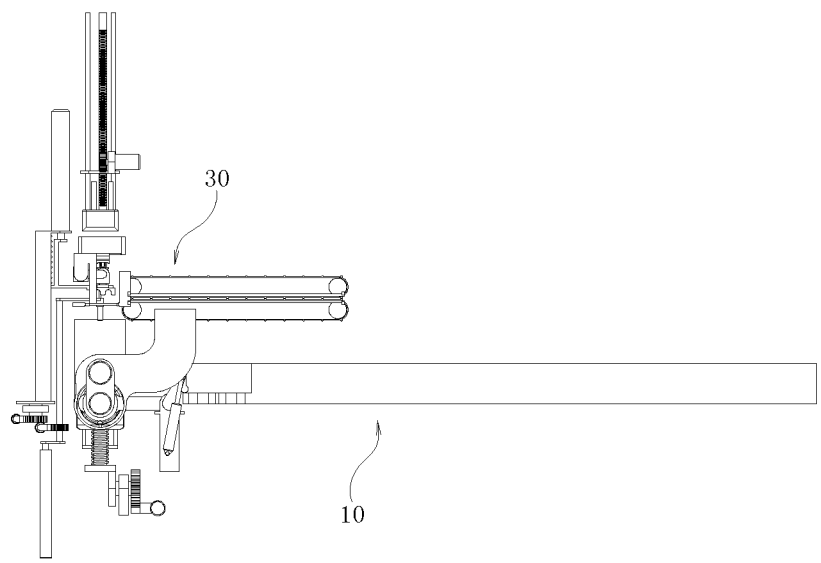
FIG. 7 is a left side view of the automatic production system for the LED lamp cap according to an embodiment of the present disclosure.
Figure 8:
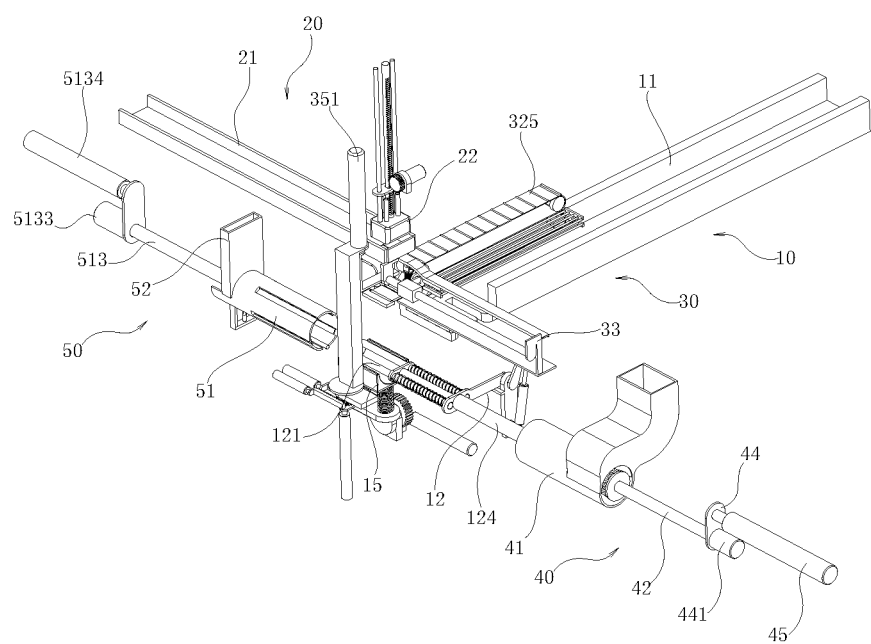
FIG. 8 schematically shows a structure of the automatic production system for the LED lamp cap according to an embodiment of the present disclosure.
Figure 9:
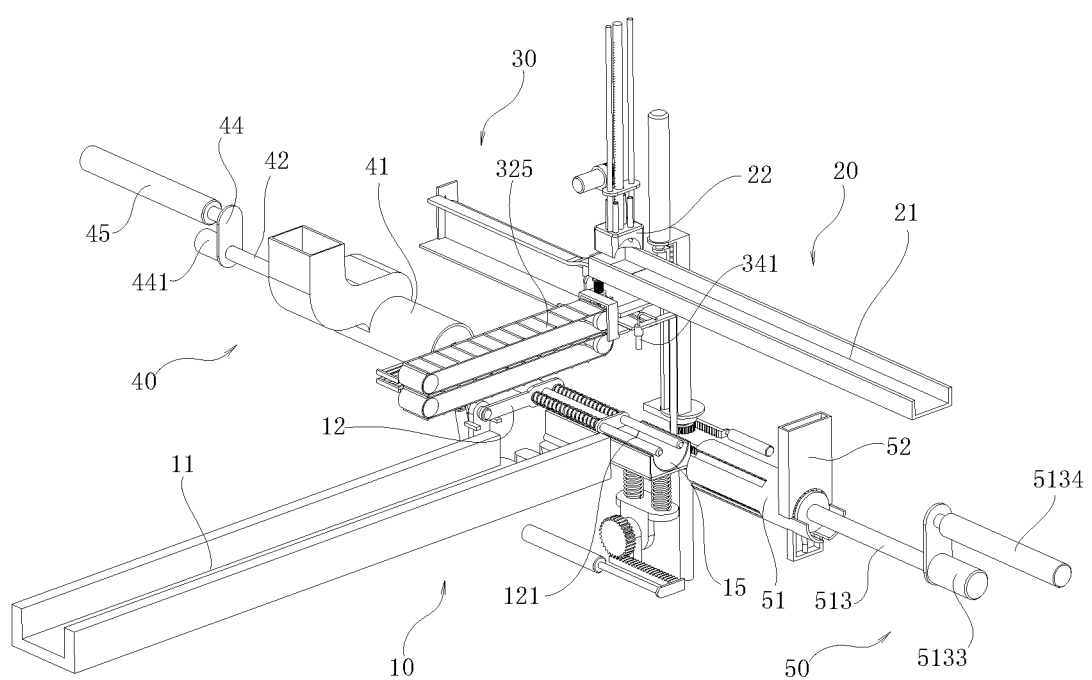
FIG. 9 schematically shows the structure of the automatic production system for the LED lamp cap according to an embodiment of the present disclosure from another perspective.
Figure 10:
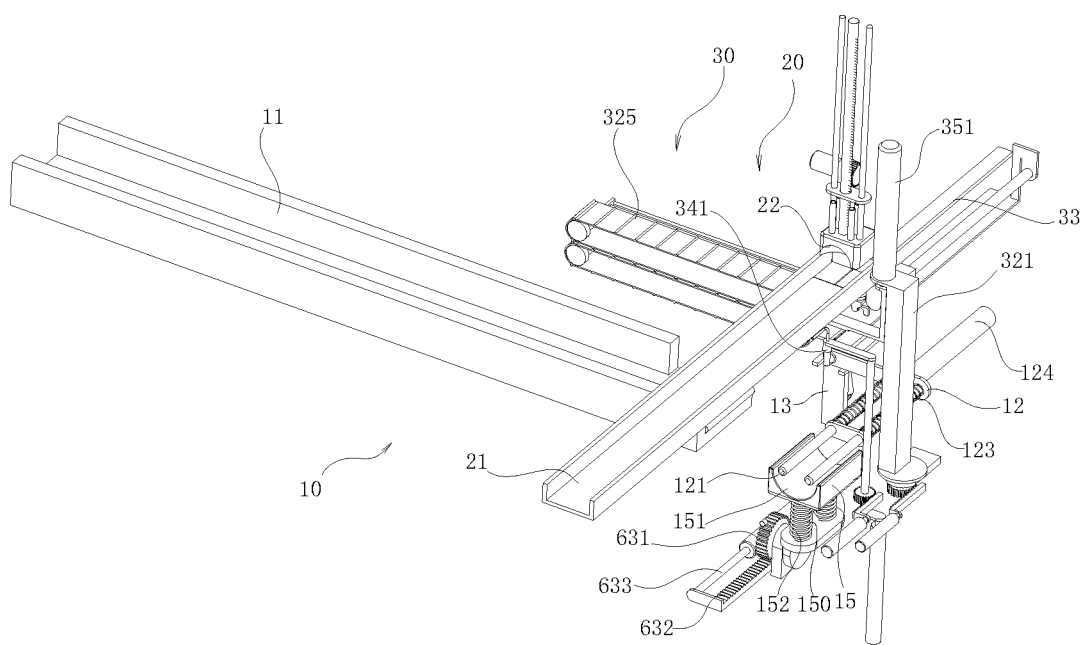
FIG. 10 is a structural diagram of a first feeding device, a second feeding device, and a third feeding device according to an embodiment of the present disclosure.
Figure 11:
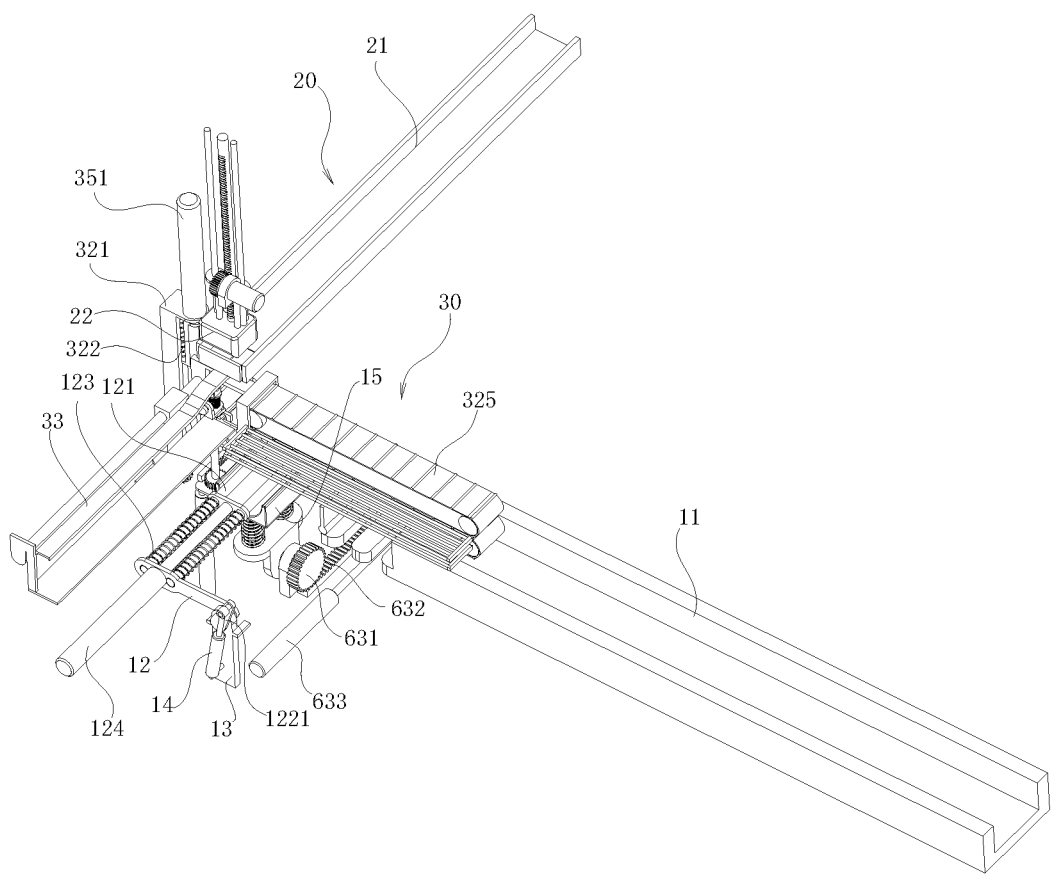
FIG. 11 is a structural diagram of the first feeding device, the second feeding device, and the third feeding device according to an embodiment of the present disclosure from another perspective.
Figure 12:
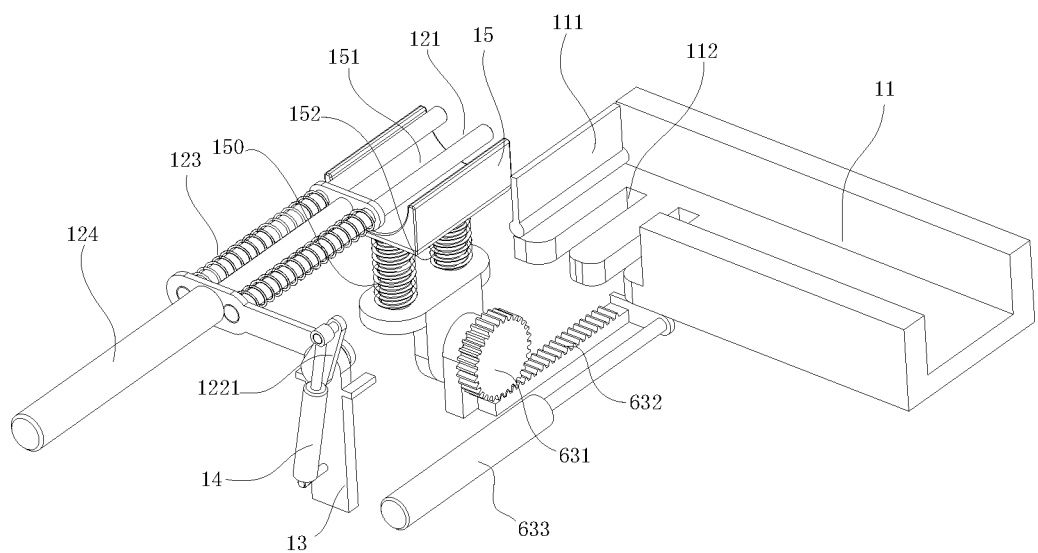
FIG. 12 is a partial structural diagram of the first feeding device according to an embodiment of the present disclosure.
Figure 13:
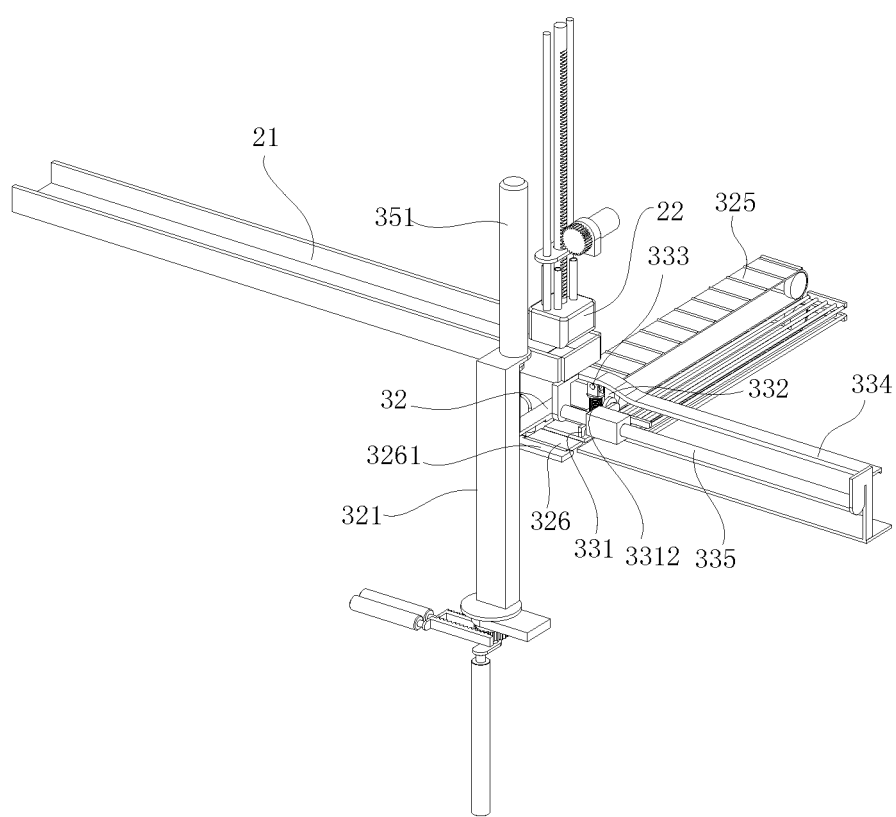
FIG. 13 is a structural diagram of the third feeding device according to an embodiment of the present disclosure.
Figure 14:
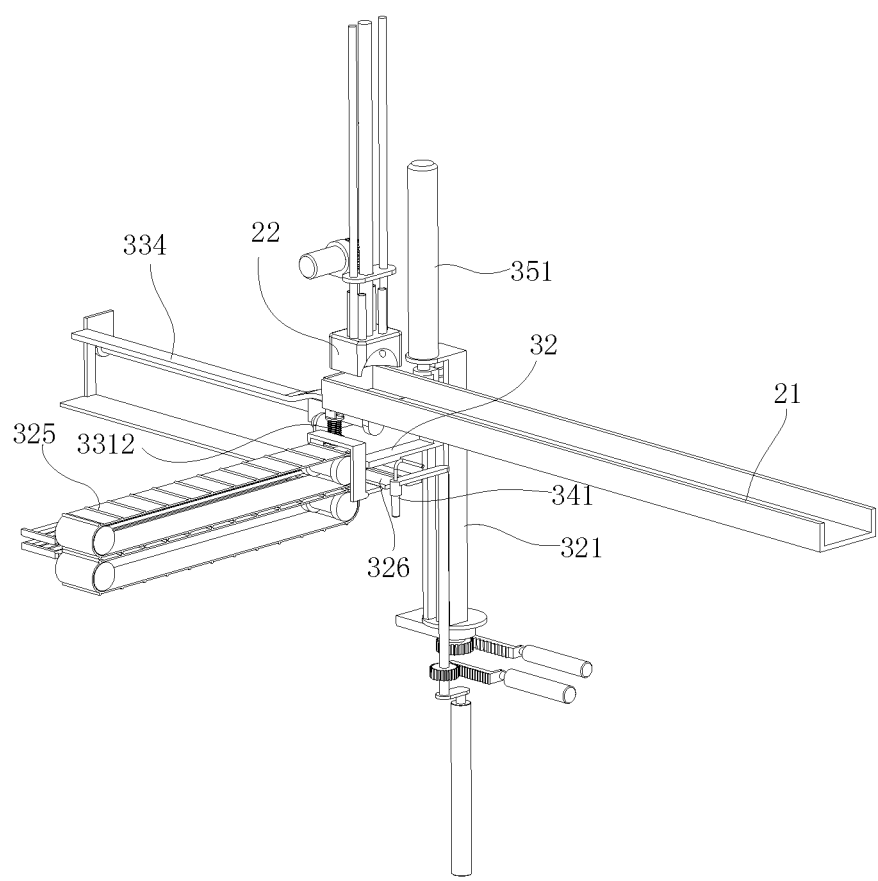
FIG. 14 is a structural diagram of the third feeding device according to an embodiment of the present disclosure.
Figure 15:
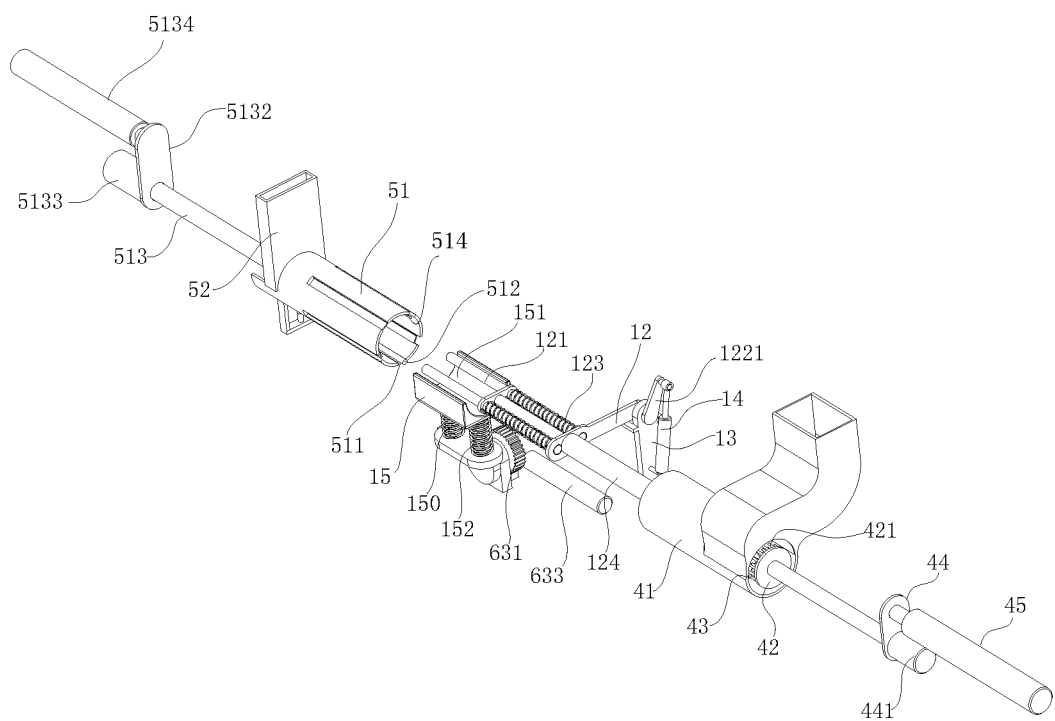
FIG. 15 is a structural diagram of a fourth feeding device and a fifth feeding device according to an embodiment of the present disclosure.
Figure 16:
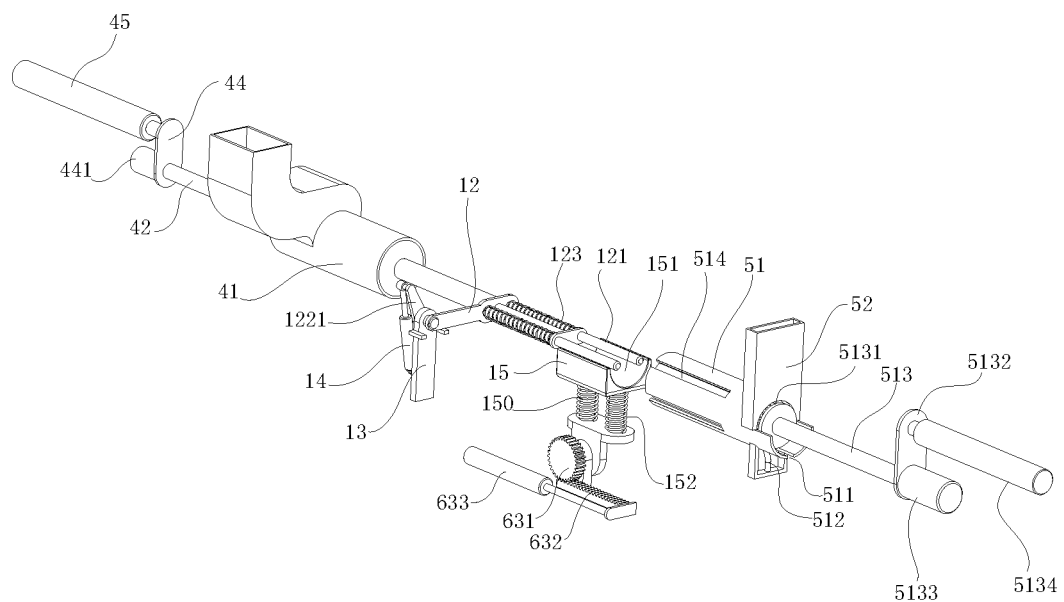
FIG. 16 is a structural diagram of the fourth feeding device and the fifth feeding device according to an embodiment of the present disclosure from another perspective.

As shown in FIGS. 1-7, during the assembly of the LED lamp cap, the first feeding device 10 feeds the heat sink base to the outlet of the first feeding device 10 in a specific posture; the second feeding device 20 feeds the reflection bowl to a position above the heat sink base in a specific posture; and the third feeding device 30 feeds the LED lamp bead to the mounting groove of the heat sink base. Then the reflection bowl is mounted on the heat sink base. After that, the fourth feeding device 40 feeds the lamp tube to be mounted outside the heat sink base to realize the automatic assembly of individual parts. The automatic production system provided herein can improve the production efficiency and quality of the LED lamp cap and enhance the protection for the LED lamp wick.

In an embodiment, a lead wire threading device is arranged on a side of the positioning-mounting mechanism, and the lead wire threading device is configured to allow a lead wire of the LED lamp bead to pass through a mounting hole of the heat sink base.

The lead wire threading device can effectively thread the lead wire of the LED lamp bead into the mounting hole of the heat sink base, thereby effectively ensuring that the lead wire can pass through an end of the heat sink base and be led out from an end of the lamp tube to achieve the assembly of parts of a vehicle lamp assembly and complete an automatic production of the LED lamp cap.

To further enhance the automatic production of the LED lamp cap, a fifth feeding device 50 is arranged on a side of the outlet of the first feeding device 10, and is configured to mount a bottom cover on the heat sink base.

In the actual production, to enable the automatic production of the LED lamp cap, a bottom cover is provided at an end of the LED lamp cap away from a lens, and the bottom cover is screwedly connected to the heat sink base arranged in the lamp tube, thereby realizing a stable connection of the heat sink base, the lamp tube, and the bottom cover. The lead wire of the LED lamp wick passes through the bottom cover to realize the automatic production of the LED lamp cap.

To guide the heat sink base, the first feeding device 10 includes a first vibration plate. An outlet of the first vibration plate is provided with a first lead-out rail 11. An outlet of the first lead-out rail 11 is provided with an extraction rack 12. The extraction rack 12 is arranged on a turnover mechanism. The turnover mechanism is configured to drive the extraction rack 12 to rotate by 180°, where a rotation axis of the extraction rack 12 is arranged horizontally. The fifth feeding device 50 is arranged on one side of the extraction rack 12, and the fourth feeding device 40 is arranged on the other side of the extraction rack 12.

The heat sink bases are distributed in the first vibration plate. The first vibration plate leads the heat sink base out to the outlet of the first lead-out rail 11. A mounting surface of the heat sink base for mounting the LED lamp wick is configured to face downward. An axis of the heat sink base is horizontal. The extraction rack 12 is configured to implement the plug-in feeding of the heat sink base. The turnover mechanism is turned on to rotate the heat sink base by 180° such that the mounting surface of the heat sink base for mounting the LED wick faces upwards, facilitating the installation of the LED lamp wick.

In an embodiment, the extraction rack 12 is provided with two extraction rods 121 arranged horizontally and spaced apart. The two extraction rods 121 are configured to move horizontally to respectively be in plug-in clamping fit with two notches on the heat sink base. The outlet of the first lead-out rail 11 is provided with a baffle plate 111. The surface of the first lead-out rail 11 is provided with two avoiding openings 112 configured to respectively avoid the two extraction rods 121. The two extraction rods 121 are slidably arranged on the extraction rack 12. Each of the two extraction rods 121 is sleeved with a return spring 123. One end of the return spring 123 abuts against one of the two extraction rods 121, and the other end of the return spring 123 abuts against the extraction rack 12. The extraction rack 12 is provided with a first cylinder 124 arranged in parallel with the two extraction rods 121. A piston rod of the first cylinder 124 is connected to the two extraction rods 121.

When the heat sink base is taken by the extraction rack 12, the turnover mechanism is started to drive the extraction rack 12 to turn over, and the two extraction rods 121 respectively form a plug-in fit with the two notches on the heat sink base to allow the two extraction rods 121 to abut against the two notches to implement the picking operation. The turnover mechanism is overturned, such that the mounting surface of the heat sink base faces upwards, facilitating the assembly of the LED lamp wick and the heat sink base. Specifically, the two extraction rods 121 respectively pass through the two avoiding openings 112 and turn to the two notches of the heat sink base to be inserted into the two notches through the return spring 123, thereby realizing the picking operation of the heat sink base.

In an embodiment, the turnover mechanism includes a turnover base 13 rotatably connected to the two avoiding openings 112. The extraction rack 12 is provided with a deflection rod 1221. The deflection rod 1221 is hinged with a piston rod of a second cylinder 14. The piston rod of the second cylinder 14 and the deflection rod 1221 are arranged vertically. The second cylinder 14 is hingedly arranged on the turnover base 13.

During the turn-over operation of the extraction rack 12, the second cylinder 14 is turned on to allow the extraction rack 12 to rotate by 180°, which can allow the mounting surface of the heat sink base for mounting the LED lamp wick to face upwards, facilitating the subsequent arrangement of the LED lamp wick.

A support base 15 is provided on a side of the turnover mechanism. The support base 15 is provided with a groove 151 configured to clamp the heat sink base. The support base 15 is provided with a support slide rod 150. The support slide rod 150 is vertically and slidably arranged on a rack. The support slide rod 150 is sleeved with a support spring 152. One end of the support spring 152 abuts against the rack, and the other end of the support spring 152 abuts against the support base 15.

After the heat sink base is led out from the outlet of the first lead-out rail 11 by the extraction rack 12 to the support base 15, the support base 15 is elastically supported by the support spring 152, which can effectively avoid damage to the LED lamp wick caused by an uneven pressure during the assembly process of the heat sink base and the LED lamp wick, thereby ensuring the quality of the finished LED lamp cap.

In an embodiment, the third feeding device 30 includes a feeding rack. The feeding rack is provided with a clamping block 32 configured to clamp the LED lamp bead. The clamping block 32 is configured to move vertically to allow the LED lamp bead to be guided into a mounting groove B1 of the heat sink base. A side of the clamping block 32 is provided with a lead wire rack 33 configured to support a wire bundle.

The LED lamp beads and the lead wire are connected in advance through an automatic welding device. The LED lamp bead welded with the lead wire is placed on the feeding rack and fed to the clamping block 32 to be clamped to fixedly arrange the LED lamp wick in the groove of the mounting surface of the heat sink base, thereby realizing the fixed installation of the LED lamp wick on the heat sink base. The lead wire rack 33 can effectively support and guide the wire bundle to avoid the twisting of the wire bundle, thereby helping the wire bundle pass through the mounting hole of the heat sink base to lead out the heat sink base and the lead wire.

In an embodiment, to ensure the fixing reliability of the LED lamp wick on the heat sink base and prevent the LED lamp wick from being moved out of the groove of the heat sink base, a gluing mechanism is provided below the clamping block 32. The gluing mechanism is configured to dispense a glue in the groove of the heat sink base. The gluing mechanism includes a gluing nozzle 341. The gluing nozzle 341 is arranged on a lifting mechanism. The lifting mechanism is configured to drive the gluing nozzle 341 to move vertically to abut against or be separated from a bottom of the slot of the heat sink base.

When the glue is dispensed on the groove of the heat sink base, the lifting mechanism drives the gluing nozzle 341 to rise and fall vertically such that the gluing nozzle 341 abuts against the bottom of the slot of the heat sink base. Then the gluing mechanism is turned on to dispensed the glue into the groove to allow the LED lamp wick and the heat sink base to be bonded, thereby ensuring the fixing reliability of the LED lamp wick on the heat sink base.

The gluing mechanism is arranged on a deflection plate. The deflection plate is connected to a deflection mechanism. After the heat sink base is led out from the outlet of the first lead-out rail 11, the deflection mechanism is started to drive the gluing nozzle 341 to move to a position above the mounting surface of the heat sink base. Then the lifting mechanism drives the gluing nozzle 341 to move vertically to abut against the bottom of the mounting groove of the heat sink base to dispense the glue into the mounting groove. After that, the deflection mechanism is reset to avoid affecting the normal installation of the heat sink base.

In an embodiment, the clamping block 32 is vertically arranged on a rail 321. A return spring 322 is arranged on the rail 321. One end of the return spring 322 abuts against an upper end of the rail 321, and the other end of the return spring 322 abuts against an upper surface of the clamping block 32. A driving head is arranged above the clamping block 32. An upper end of the driving head is connected to a piston rod of a third cylinder 351. The third cylinder 351 is arranged vertically.

When mounting the LED lamp wick on the mounting surface of the heat sink base, the third cylinder 351 is turned on to lower the driving head to allow the clamping block 32 to move vertically along the rail 321 such that the LED lamp wick below the clamping block 32 is vertically clamped in the groove of the heat sink base to realize the assembly of the heat sink base and the LED lamp wick.

In an embodiment, the clamping block 32 is vertically and slidably arranged on a lifting block. A compression spring is arranged between the clamping block 32 and the lifting block. The lifting block is vertically and slidably arranged on the track 321. One end of the return spring 322 abuts against an upper surface of the lifting block, and the other end of the return spring 322 abuts against an upper end of the rail 321.

In the vertical movement of the clamping block 32, the clamping block 32 is elastically connected to the lifting block through the compression spring. Then the third cylinder 351 is turned on to allow the clamping block 32 to elastically abut against the support base 15 to avoid the damage to the LED lamp wick caused by the compression from the clamping block 32 and the support base 15, thereby ensuring the quality of the LED lamp cap.

To implement the guide of the LED lamp bead to realize the automatic production of the LED lamp cap, a side of the clamping block 32 is provided with two sets of clamping belts 325 configured to clamp the LED lamp bead. An outlet of each of the two sets of clamping belts 325 is provided with a support plate 326 configured to support the LED lamp bead. A side of the support plate 326 is hinged on a frame 3261, and a hinged axis is arranged horizontally. The clamping block 32 is arranged above the frame 3261. A bottom of a slot of the clamping block 32 is provided with an air suction port. The air suction port is communicated with an air inlet of a suction unit. The suction unit is configured to adsorb the LED lamp bead.

To implement the feed of the LED lamp bead, the LED lamp bead is clamped between the two sets of clamping belts 325. With the rotation of the two sets of clamping belts 325, the LED lamp bead is automatically guided to the support plate 326 and is clamped at the frame 3261. The clamping block 32 is started to move vertically such that the LED lamp bead can be vertically led out from the frame 3261 to the groove of the mounting surface of the heat sink base. The clamping block 32 is adsorbed through the air suction port to prevent the LED lamp wick from falling off the clamping block 32.

In an embodiment, the lead wire rack 33 is provided with a grate rack 331. The grate rack 331 is vertically and slidably arranged on a lifting rack 332 through a vertical sliding rod. The lifting rack 332 is horizontally and slidably arranged on the lead wire rack 33. The vertical sliding rod is sleeved with a vertical spring 3312. One end of the vertical spring 3312 is connected to the lead wire rack 33, and the other end of the vertical spring 3312 is connected to the lifting rack 332. An end of the vertical sliding rod 3312 extending out of the lifting rack 332 is provided with a lifting roller 333. The lifting roller 333 abuts against a lifting folded plate 334. The lead wire rack 33 is horizontally provided with a fourth cylinder 335. A piston of the fourth cylinder 335 is connected to the lifting rack 332. The lifting folded plate 334 is arranged in parallel with the fourth cylinder 335.

The lead wire of the LED lamp wick below the clamping block 32 is straightened to help the lead wire to be threaded into the through hole on the heat sink base. Specifically, the fourth cylinder 335 is turned on to move the lifting rack 332 horizontally and allow the lifting roller 333 to abut against the lifting folded plate 334 such that the grate rack 331 can abut against the wire bundle. As the grate rack 331 moves horizontally, the wire bundle is straightened to help the lead wire to pass through the through hole on the heat sink base to complete the threading of the wiring bundle on the heat sink base.

The second feeding device 20 includes a second lead-out rail 21 arranged above the outlet of the third feeding device 30. A compression joint 22 is provided at an outlet of the second lead-out rail 21. The compression joint 22 is provided with a groove configured to accommodate the reflection bowl. An adsorption mechanism is arranged in the compression joint 22 and is configured to adsorb the reflection bowl.

The reflection bowl is placed in the second vibration plate, and then the second vibration plate is fed to the second lead-out rail 21. The compression joint 22 is started to move vertically to vertically press the reflection bowl at the outlet of the second lead-out rail 21 to the heat sink base. Then the adsorption mechanism implements the adsorption of the reflection bowl to prevent the reflection bowl from falling down from the groove of the compression joint 22.

In an embodiment, to facilitate the fixing assembly of the reflection bowl and the heat sink base, the reflection bowl is provided with a clamping hole. A clamping boss is arranged on a side of a slot on the heat sink base for clamping a LED lamp wick. The clamping boss is in plug-in fit with the clamping hole arranged on the reflection bowl.

The compression joint 22 moves vertically to allow the reflection bowl to be fed to a position above the mounting surface of the heat sink base such that the clamping hole on the reflection bowl is in plug-in fit with the clamping boss, thereby realizing the assembly of the reflection bowl and the heat sink base.

In an embodiment, in order to allow the reflection bowl to be vertically led out from the outlet of the second lead-out rail 21, the outlet of the second lead-out rail 21 is provided with a baffle plate. A bottom of the second lead-out rail 21 is hingedly provided with two crimping plates 212. A hinged shaft of each of the two crimping plates 212 is arranged horizontally and in parallel with the second lead-out rail 21. The hinged shaft is sleeved with a torsion spring. The torsion spring is configured to allow surfaces of the two crimping plates to be horizontal.

In an embodiment, the heat sink base is provided with a notch configured to accommodate a wiring bundle. The notch is arranged along an axial direction of the heat sink base. The fifth feeding device 50 includes a feeding pipe 51. A pipe core of the feeding pipe 51 is horizontal and arranged in parallel with an extraction rack 12 of the first feeding device 10. A mouth of the feeding pipe 51 is arranged close to or away from an end of the heat sink base on the extraction rack 12. An edge of the bottom cover is provided with an opening corresponding to the notch on the heat sink base. The opening is configured to accommodate the wire bundle.

After the reflection bowl is arranged on the heat sink base, the fifth feeding device 50 is turned on to feed the bottom cover to the feeding pipe 51 and lead the bottom cover out from an end of the feeding pipe 51 in a surface-vertical posture. The notch provided on the heat sink base can effectively clamp the lead wire. Moreover, the bottom cover is also provided with a clamping device configured to clamp the lead wire such that the lead wire can be led out from an end cover of the LED lamp cap.

The mouth of the feeding pipe 51 faces to a position just beside the extraction rack 12. When the bottom cover is led out from the pipe end of the feeding pipe 51, the bottom cover is corresponded to an end of the heat sink base to facilitate the subsequent installation operations.

In an embodiment, an inlet of the feeding pipe 51 is provided with a vertical lead-in pipe 52. An outlet of the vertical lead-in pipe 52 is in communication with the inlet of the feeding pipe 51. The vertical lead-in pipe 52 has a flat-pipe structure, and a cavity of the vertical lead-in pipe is configured as a channel to allow the bottom cover to pass through. The vertical lead-in pipe 52 is configured to allow the bottom cover to be vertically introduced into the feeding pipe 51.

The bottom cover is put into a third vibration plate. The bottom cover is led out from an outlet of the third vibration plate to the vertical lead-in pipe 52. The vertical lead-in pipe 52 makes the surface of the bottom cover vertical and feeds the bottom cover to the feeding pipe 51 such that the bottom cover can be led out vertically to be assembled with the heat sink base.

In an embodiment, a pipe wall of the feeding pipe 51 is provided with an elongated opening 511. The elongated opening 511 is tubularly arranged along a length direction of the feeding pipe 51. A positioning sliding rod 512 is provided in the elongated opening. The positioning sliding rod 512 is arranged along a length direction of the elongated opening 511.

To ensure the accuracy of the assembly of the bottom cover E and the heat sink base, the position of the bottom cover E and the heat sink base needs to be adjusted to a correct position. Through the positioning sliding rod 512, the notch of the bottom cover E can be clamped at the positioning sliding rod 512 to avoid that the bottom cover E rotates freely in the feeding pipe 51, making the bottom cover E unable to be correctly installed at the heat sink base. The positioning sliding rod 512 is arranged along the length of the elongated opening 511, which can effectively realize the alignment of the bottom cover E. When the positioning of the bottom cover E is done, the bottom cover E is exactly corresponding to the heat sink B to ensure the installation accuracy of the heat sink B and the bottom cover E.

In an embodiment, a lead-out head 513 is provided in the cavity of the feeding pipe 51. A positioning elastic piece 514 is arranged on an inner wall of the feeding pipe 51. The positioning elastic piece 514 is arranged along the length direction of the feeding pipe 51 and extends out of the inner wall of the feeding pipe 51. The lead-out head 513 and the positioning elastic piece 514 are arranged spaced apart. A gap between the lead-out head 513 and the positioning elastic piece 514 is configured as an inlet of the bottom cover.

When the bottom cover is deflectedly introduced into the feeding pipe 51 from the vertical lead-in tube 52, to prevent the bottom cover from deflection, the positioning elastic piece 514 is configured to abut against an outer wall of the bottom cover. The lead-out head 513 moves along the length direction of the feeding pipe 51 such that the bottom cover can slide along the length direction of the feeding pipe 51 to allow the bottom cover to abut against the positioning elastic piece 514. As a consequence, the bottom cover can be vertically led out from the pipe end of the feeding pipe 51, thereby enabling the accurate installation and positioning of the bottom cover and the heat sink base.

To deflect the bottom cover and clamp the notch of the bottom cover in the positioning sliding rod 512 to realize the effective positioning of the bottom cover, the lead-out head 513 is provided with bristles 5131. The lead-out head 513 is rotatably arranged on a lead-out rack 5132. The lead-out rack 5132 is arranged on a lead-out mechanism. An end of the lead-out head 513 is connected to a driving unit. The driving unit is configured to drive the lead-out head 513 to rotate, where a rotation axis of the lead-out head 513 is arranged in parallel with the feeding pipe 51.

The driving unit drives the bristles 5131 of the lead-out head 513 to rotate the bottom cover until the notch of the bottom cover is clamped in the positioning sliding rod 512 such that the bristles 5131 at the bottom cover can continue to rotate. Then the lead-out mechanism is turned on such that the lead-out head 513 can move horizontally and the bottom cover can slide horizontally along the feeding pipe 51 to allow the bottom cover to be close to the heat sink base and assembled with the heat sink base.

In an embodiment, the driving unit is a rotating motor 5133 arranged on the lead-out rack 5132. The rotating motor 5133 is configured to drive the lead-out head 513 to rotate. The lead-out head mechanism includes a lead-out cylinder 5134 connected to the lead-out rack 5132. The lead-out cylinder 5134 is arranged in parallel with the feeding pipe 51.

The rotating motor 5133 is turned on. When the bottom cover is led out from the feeding pipe 51, the lead-out cylinder 5134 is turned on to rotate the lead-out head 513.

To ensure that the lead wire can be smoothly clamped in the notches of the heat sink base and the bottom cover, the lead wire threading device includes a threading base rotatably connected to the turnover base 13. A hinged shaft of the turnover base 13 is arranged horizontally. The turnover mechanism is configured to drive the turnover base 13 to rotate by 180°.

The turnover mechanism is turned on such that the mounting surface of the heat sink base can be turned over from a horizontal-up state to a horizontal-down state and the straighten lead wire can be reliably clamped in the notches of the heat sink base and the bottom cover to fixedly arrange the wiring bundle in the heat sink base and the bottom cover.

To ensure the lead wire can be reliably clamped in the notches of the heat sink base and the bottom cover, a compression rod is provided at a side of the threading base. The compression rod abuts against a lead wire of a LED lamp wick. The compression rod is configured to move vertically to abut against or be separated from the LED lamp wick.

Before turning over the turnover base 13, the compression rod is vertical and abuts against the lead wire beside the heat sink base. Then the compression mechanism is turned on such that the lead wire can be clamped in the notches of the heat sink base and the bottom cover to complete the clamping of the lead wire.

In an embodiment, to turn over the turnover base 13, the turnover mechanism includes a turnover gear 631 connected to an end of the hinged shaft of the turnover base 13. The turnover gear 631 is engaged with a turnover gear rack 632. The turnover gear rack 632 is arranged horizontally. An end of the turnover gear rack 632 is connected to a piston of a third cylinder 633.

During the turnover operation of the turnover base 13, the turnover cylinder 633 is turned on to drive the turnover base 13 to rotate such that the mounting surface of the heat sink base can face downward to enable the wiring bundle to be clamped in the notches of the heat sink base and the bottom cover to realize the threading of the wiring bundle.

In an embodiment, the fourth feeding device 40 includes a lamp tube feeding pipe 41. The lamp tube feeding pipe 41 is arranged on a side of an extraction rack 12 of the first feeding device 10. The lamp tube feeding pipe 41 is arranged in parallel with a length direction of the extraction rack 12 of the first feeding device 1. An end of the lamp tube feeding pipe 41 is provided with a lamp tube guide head 42. The lamp tube guide head 42 is configured to move horizontally along the lamp tube feeding pipe 41 to assemble the lamp tube with the heat sink base.

The lamp tube is placed in a fourth vibration plate. The fourth vibration plate leads the lamp tube out to the lamp tube feeding pipe 41. The lamp guide head at an end of the feeding pipe 41 moves horizontally to allow the lamp tube to be moved horizontally along the feeding pipe 41 to be assembled with the heat sink base, thereby realizing the automatic production of the lamp tube and the heat sink base.

To ensure that the lamp tube can be accurately led out to an end of the lamp tube feeding pipe 41, the positioning-mounting mechanism includes a positioning head arranged in the lamp tube feeding pipe 41. An outer wall of the lamp tube is provided with a protrusion. The positioning head extends to a blocking claw 43 arranged at an inner wall of the lamp tube feeding pipe 4. The blocking claw 43 abuts against the protrusion. A rotating mechanism is arranged in the lamp tube feeding pipe 41. The rotating mechanism is configured to drive the lamp tube to rotate.

To position the lamp tube accurately, the rotating mechanism is turned on to allow the lamp tube to rotate and enable the blocking convex claw 43 to abut against the protrusion of the outer wall of the lamp tube such that the lamp tube can be combined with the heat sink base at a preset position. Then the lamp tube guide head 42 is turned on to connect the lamp tube with the heat sink base to realize the assembly of the heat sink base and the lamp tube.

In an embodiment, an end surface of the lamp tube guide head 42 is provided with rotating bristles 421. The rotating bristles 421 abut against an end of the lamp tube. The lamp tube guide head 42 is rotatably arranged on a guide head rack 44. The rotating mechanism is configured to drive the lamp tube guide head 42 to rotate on the guide head rack 44. The guide head rack 44 is connected to a guide head translation mechanism. The guide head translation mechanism is configured to drive the lamp tube guide head 42 to move along the lamp tube feeding pipe 41.

To rotate the lamp tube, the rotating bristles 421 at a front end of the lamp tube guide head 42 abut against a lens arranged at an end of the lamp tube to allow the lamp tube to rotate such that the blocking claw 43 can abut against the protrusion of the outer wall of the lamp tube. As a consequence, the lamp tube can be combined with the heat sink base at a preset position. The lamp tube guide head 42 slides horizontally along the feeding pipe 41 such that the heat sink base can be accurately inserted in the lamp tube. In addition, a screw arranging device can effectively implement the assembly of the bottom cover and the end of the lamp tube.

To make the lamp tube rotate and move horizontally, the guide head rack 44 is provided with a rotating motor 441. The rotating motor 441 and the lamp tube guide head 42 are configured to be active. The guide head translation mechanism includes a cylinder 45 connected to the guide head rack 44. A length direction of the cylinder 45 is in parallel with that of the lamp tube feeding pipe 41.

Provided below is a method for automatically producing a LED lamp cap, which includes the following steps.

(S1) A heat sink base is placed in a first feeding device 10, and the first feeding device 10 is turned on to feed the heat sink base to an outlet of a first lead-out rail 11 of the first feeding device 10.

(S2) A reflection bowl is placed in a second feeding device 20, and the second feeding device 20 is turned on to feed the reflection bowl to an outlet of a second lead-out track 21 of the second feeding device 20.

(S3) A LED lamp bead is staked on a feeding rack of a third feeding device 30 via an automatic stacking device to feed the LED lamp bead to a clamping block 32.

(S4) A bottom cover is placed in a fifth feeding device 50, the fifth feeding device 50 is turned on to feed the bottom cover to a feeding pipe 51 of the fifth feeding device 50.

(S5) A lamp tube is placed in a fourth feeding device 40. Then the fourth feeding device 40 is turned on to feed the lamp tube to a lamp tube feeding channel 41 of the fourth feeding device 40.

(S6) A gluing mechanism is turned on to dispense a glue to a mounting groove of the heat sink base.

(S7) The clamping block 32 moves vertically to push the LED lamp wick into the mounting groove of the heat sink base.

(S8) A compression joint 22 of the second feeding device 20 is started to move vertically to push the reflection bowl to a mounting surface of the heat sink base, so as to fixedly arrange the reflection bowl on the heat sink base.

(S9) A lead-out head 513 of the fifth feeding device 50 is started to allow the bottom cover to abut against an end of the heat sink base and be mounted on the heat sink base.

(S10) A lead wire threading device is turned on to allow the heat sink base to rotate such that a lead wire is clamped in a notch of the heat sink base and an opening of the bottom cover.

(S11) A lamp tube guide head 42 of the fourth feeding device 40 is started to move to push the lamp tube to be inserted in the heat sink base.

(S12) Steps (S6)-(S11) are repeated to assemble a plurality of lamp caps.

What is claimed is:

1. A device for installing a reflection bowl of an intelligent light-emitting diode (LED) headlamp, comprising:
    a first feeding device;
    a second feeding device; and
    a third feeding device;
    wherein the first feeding device is configured to lead a heat sink base out; the second feeding device is configured to lead the reflection bowl out to an outlet of the first feeding device and assemble the reflection bowl with the heat sink base; and the third feeding device is configured to feed a LED lamp bead to the outlet of the first feeding device and assemble the LED lamp bead with the heat sink base;
    the third feeding device comprises a feeding rack; the feeding rack is provided with a clamping block configured for clamping the LED lamp bead; the clamping block is configured to move vertically to allow the LED lamp bead to be guided into a groove of the heat sink base; and a lead wire rack configured for supporting a wire bundle is arranged on a side of the clamping block;
    the clamping block is vertically arranged on a rail; and a return spring is arranged on the rail;
    the clamping block is vertically and slidably arranged on a lifting block; a compression spring is arranged between the clamping block and the lifting block; the lifting block is vertically and slidably arranged on the rail; and one end of the return spring abuts against an upper end of the lifting block, and the other end of the return spring abuts against an upper end of the rail;
    a side of the clamping block is provided with two sets of clamping belts configured to clamp the LED lamp bead; an outlet of each of the two sets of clamping belts is provided with a support plate configured for supporting the LED lamp bead; a side of each of the support plate is hinged on a frame, wherein a hinge axis is arranged horizontally; the clamping block is arranged above the frame; a bottom of a slot of the clamping block is provided with an air suction port; the air suction port is communicated with an inlet of a suction unit; and the suction unit is configured to adsorb the LED lamp bead; and
    the lead wire rack is provided with a grate rack; the grate rack is vertically and slidably arranged on a lifting rack through a vertical sliding rod; the lifting rack is horizontally and slidably arranged on the lead wire rack; the vertical sliding rod is sleeved with a vertical spring; one end of the vertical spring is connected to the lead wire rack, and the other end of the vertical spring is connected to the lifting rack; an end of the vertical sliding rod extending out of the lifting rack is provided with a lifting roller; the lifting roller abuts against a lifting folded plate; the lead wire rack is provided with a horizontal cylinder; a piston of the horizontal cylinder is connected with the lifting rack; and the lifting folded plate is arranged in parallel with the horizontal cylinder.

2. The device of claim 1, wherein the first feeding device comprises a vibration plate; an outlet of the vibration plate is provided with a lead-out rail; an outlet of the lead-out rail is provided with an extraction rack; the extraction rack is arranged on a turnover mechanism; the turnover mechanism is configured to drive the extraction rack to rotate by 180° turning motion, wherein a rotation axis of the extraction rack is arranged horizontally; a fourth feeding device is arranged on one side of the extraction rack; and a fifth feeding device is arranged on the other side of the extraction rack.

3. The device of claim 2, wherein the extraction rack is provided with two extraction rods arranged horizontally and spaced apart; the two extraction rods are configured to move horizontally to respectively form a plug-in clamping fit with two notches on the heat sink base; a baffle plate is arranged at the outlet of the lead-out rail; a surface of the lead-out rail is provided with two openings to respectively avoid the two extraction rods; the two extraction rods are slidably arranged on the extraction rack; each of the two extraction rods is sleeved with a return spring; one end of the return spring abuts against one of the two extraction rods, and the other end of the return spring abuts against the extraction rack; the extraction rack is provided with a first cylinder; the first cylinder is arranged in parallel with the two extraction rods; and a piston rod of the first cylinder is connected to the two extraction rods.

4. The device of claim 3, wherein the turnover mechanism comprises a turnover base; the turnover base is rotatably connected to the extraction rack; the extraction rack is provided with a deflection rod; the deflection rod is hinged with a piston rod of a second cylinder; the piston rod of the second cylinder and the deflection rod are arranged vertically; and the second cylinder is hingedly arranged on the turnover base;
    a support base is arranged on a side of the turnover mechanism; a groove for clamping the heat sink base is arranged on the support base; a support slide rod is arranged on the support base; the support slide rod is vertically and slidably arranged on a rack; the support slide rod is sleeved with a support spring; and one end of the support spring abuts against the rack, and the other end of the support spring abuts against the support base.

5. The device of claim 1, wherein a gluing mechanism is arranged below the clamping block; the gluing mechanism is configured to dispense a glue on the groove of the heat sink base; the gluing mechanism comprises a gluing nozzle; the gluing nozzle is arranged on a lifting mechanism; and the lifting mechanism is configured to move the gluing nozzle vertically to abut against or be separated from a bottom of the groove of the heat sink base.

6. The device of claim 5, wherein an upper end of the return spring abuts against an upper end of the rail, and a lower end of the return spring abuts against an upper surface of the clamping block; a drive head is arranged above the clamping block; an upper end of the drive head is connected to a piston rod of a driving cylinder, and the driving cylinder is arranged vertically.

7. The device of claim 1, wherein the second feeding device comprises a lead-out rail arranged above an outlet of the third feeding device; an outlet of the lead-out rail is provided with a compression joint; the compression joint is provided with a groove configured to accommodate the reflection bowl; an adsorption mechanism is arranged in the compression joint; and the adsorption mechanism is configured to adsorb the reflection bowl.

8. The device of claim 7, wherein the reflection bowl is provided with a clamping hole; a clamping boss is arranged on a side of a slot of the heat sink base for clamping a LED lamp wick; and the clamping boss is in plug-in fit with the clamping hole arranged on the reflection bowl; and a baffle plate is arranged at the outlet of the lead-out rail;
a bottom of the lead-out rail is hingedly provided with two crimping plates; a hinged shaft of each of the two crimping plates is horizontal and arranged in parallel with the lead-out rail; the hinged shaft is sleeved with a torsion spring, and the torsion spring is configured to allow surfaces of the two crimping plates to be horizontal.

* * * * *